US007023808B2

(12) United States Patent
Ball et al.

(10) Patent No.: US 7,023,808 B2
(45) Date of Patent: Apr. 4, 2006

(54) SYSTEM AND METHOD FOR DISTRIBUTING ROUTE SELECTION IN AN IMPLEMENTATION OF A ROUTING PROTOCOL

(75) Inventors: David Alexander Ball, Herts (GB); R. Eric Bennett, Ann Arbor, MI (US); Martin Hesketh, St. Albans (GB); John Galen Scudder, Ann Arbor, MI (US); David D. Ward, Somerset, WI (US)

(73) Assignee: Cisco Technology, Inc., San Jose, CA (US)

(*) Notice: Subject to any disclaimer, the term of this patent is extended or adjusted under 35 U.S.C. 154(b) by 46 days.

(21) Appl. No.: 10/743,973

(22) Filed: Dec. 23, 2003

(65) Prior Publication Data

US 2005/0135256 A1 Jun. 23, 2005

(51) Int. Cl.
*H04J 1/16* (2006.01)
(52) U.S. Cl. ...................... 370/238; 307/235
(58) Field of Classification Search ........ 370/229–235, 370/238, 241, 241.1, 247, 252
See application file for complete search history.

(56) References Cited

U.S. PATENT DOCUMENTS

| 5,088,032 | A | | 2/1992 | Bosack |
| 5,519,704 | A | * | 5/1996 | Farinacci et al. ........... 370/402 |
| 5,617,421 | A | | 4/1997 | Chin et al. |
| 5,881,243 | A | * | 3/1999 | Zaumen et al. ............. 709/241 |
| 6,370,119 | B1 | | 4/2002 | Basso et al. |
| 6,400,681 | B1 | | 6/2002 | Bertin et al. |
| 6,584,093 | B1 | * | 6/2003 | Salama et al. .............. 370/351 |
| 2005/0074001 | A1 | | 4/2005 | Mattes et al. |
| 2005/0074003 | A1 | | 4/2005 | Ball et al. |

OTHER PUBLICATIONS

Radia Perlman, Interconnections, Bridges and Routers, Addison Wesley Publishing Company, pp. 323-329, 1992.
Y. Rekhter et al., "A Border Gateway Protocol 4 (BGP-4)" Request For Comments (RFC) 1771, Internet Engineering Task Force, http://www.ietf.org, Mar. 1995, pp. 1-57.
Y. Rekhter et al., <draft-ietf-idr-bgp4-23.txt> "A Border Gateway Protocol 4 (BGP-4)", Internet Engineering Task Force, http://www.ietf.org, Nov. 2003, pp 1-98.

(Continued)

*Primary Examiner*—Dang Ton
*Assistant Examiner*—Phuc Tran
(74) *Attorney, Agent, or Firm*—Cesari and McKenna, LLP

(57) ABSTRACT

A partial best path technique distributes route selection in a routing protocol implementation on a router. The technique also ensures that announced paths received from peers of the router (i.e., a "load") are compared in a correct order to select best paths that are then used by the router to forward packets and to advertise to the peers. When employed in a distributed architecture, the technique further reduces memory usage. To that end, the partial best path technique enhances a best path selection algorithm executed by the router to enable dispersion of the received path load among processing nodes or elements of the router, while maintaining the ordering requirement of the algorithm. The partial best path technique essentially provides an enhancement to the best path selection algorithm that selects a subset of paths from a plurality of paths, with that subset being the minimal subset needed to select the best paths.

26 Claims, 7 Drawing Sheets

OTHER PUBLICATIONS

T. Bates et al., "Multiprotocol Extensions for BGP-4" Request for Comments (RFC) 2858, Internet Engineering Task Force, http://www.ietf.org/, Jun. 2000 pp 1-11.

R. Chandra et al., "Capabilities Advertisement with BGP-4" RFC 3392, Internet Enginerring Tast Force, http://www.ietf.org/, Nov. 2002, pp 1-6.

G. Nalawade et al., <draft-nalawade-bgp-soft-notify-00.txt> "BGPv4 Soft-Notification Message", Internet Engineering Task Force, http://www.ietf.org/, Oct. 2003, pp 1-9.

Reynolds et al., "Assigned Numbers" Request for Comments (RFC) 1700, Internet Engineering Task Force, http://www.ietf.org/, Oct. 1994, pp 1-215.

"Address Family Numbers", http://www.iana.org/, last updated May 14, 2002.

"SAFI-Subsequence Address Family Identifier per [RFC2858]", http://www.iana.org/, last updated Feb. 12, 2004.

Tanenbaum, Andrew S., "Computer Networks" Third Edition; Chapter 1, Section 1.4.2, "The TCP/IP Reference Model"; Prentice Hall PTR, 1996, New Jersey, pp. 35-38.

"Notification of Transmittal of The International Search Report and the Written Opinion of the International Searching Authority, or the Declaration", International Application No. PCT/US04/42667 with an International Filing Date of Dec. 17, 2004.

"Written Opinion of the International Searching Authority" International Application No. PCT/US04/42667 with an International Filing Date of Dec. 17, 2004.

* cited by examiner

SYSTEM AND METHOD FOR DISTRIBUTING ROUTE SELECTION IN AN IMPLEMENTATION OF A ROUTING PROTOCOL

CROSS-REFERENCE TO RELATED APPLICATION

The present invention is related to the following commonly assigned U.S. patent application Ser. No. 10/677,797 titled, Distributed Software Architecture for Implementing BGP, filed on Oct. 2, 2003.

FIELD OF THE INVENTION

The invention relates generally to routing protocols used in computer networks and, more particularly, to a technique that distributes route selection in an implementation of a routing protocol.

BACKGROUND OF THE INVENTION

A computer network is a geographically distributed collection of interconnected communication links used to transport data between nodes, such as computers. Many types of computer networks are available, with the types ranging from local area networks (LANs) to wide area networks (WANs). The nodes typically communicate by exchanging discrete packets or messages of data according to predefined protocols. In this context, a protocol consists of a set of rules defining how the nodes interact with each other.

Computer networks may be further interconnected by an intermediate node, such as a router, to extend the effective "size" of each network. Since management of a large system of interconnected computer networks can prove burdensome, smaller groups of computer networks may be maintained as routing domains or autonomous systems. The networks within an autonomous system are typically coupled together by conventional "intradomain" routers. Yet it still may be desirable to increase the number of nodes capable of exchanging data; in this case, interdomain routers executing interdomain routing protocols are used to interconnect nodes of the various autonomous systems.

An example of an interdomain routing protocol is the Border Gateway Protocol version 4 (BGP), which performs routing between autonomous systems by exchanging routing (reachability) information among neighboring interdomain routers of the systems. An adjacency is a relationship formed between selected neighboring (peer) routers for the purpose of exchanging routing information messages and abstracting the network topology. Before transmitting such messages, however, the peers cooperate to establish a logical "peer" connection (session) between the routers. BGP establishes reliable connections/sessions using a reliable/sequenced transport protocol, such as the Transmission Control Protocol (TCP).

The reachability information exchanged by BGP peers typically includes destination address prefixes, i.e., the portions of destination addresses used by the routing protocol to render routing ("next hop") decisions. Examples of such destination addresses include Internet Protocol (IP) version 4 (IPv4) and version 6 (IPv6) addresses. A prefix implies a combination of an IP address and a mask that cooperate to describe an area of the network that a peer can reach. Each prefix may have a number of associated paths; each path is announced to a BGP router by one or more of its peers. The BGP routing protocol standard is well known and described in detail in *Request For Comments (RFC)* 1771, by Y. Rekhter and T. Li (1995), Internet Draft <draft-ietf-idr-bgp4-22.txt> titled, *A Border Gateway Protocol 4* (BGP-4) by Y. Rekhter and T. Li (April 2003) and *Interconnections, Bridges and Routers*, by R. Perlman, published by Addison Wesley Publishing Company, at pages 323–329 (1992), all disclosures of which are hereby incorporated by reference.

The interdomain routers configured to execute an implementation of the BGP protocol, referred to herein as BGP routers, perform various routing functions, including transmitting and receiving routing messages and rendering routing decisions based on routing metrics. Each BGP router maintains a routing table that lists all feasible paths to a particular network. Periodic refreshing of the routing table is generally not performed; however, BGP peer routers residing in the autonomous systems exchange routing information under certain circumstances. For example, when a BGP router initially connects to the network, the peer routers exchange the entire contents of their routing tables. Thereafter when changes occur to those contents, the routers exchange only those portions of their routing tables that change in order to update their peers' tables. These update messages are thus incremental update messages sent in response to changes to the contents of the routing tables and announce only a best path to a particular network.

Broadly stated, a BGP router generates routing update messages for an adjacency, also known as a peer router by "walking-through" the routing table and applying appropriate routing policies. A routing policy is information that enables a BGP router to rank routes according to filtering and preference (i.e., the "best path"). Routing updates provided by the update messages allows BGP routers of the autonomous systems to construct a consistent view of the network topology. The update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks, 3rd Edition*, by Andrew S. Tanenbaum, published by Prentice-Hall (1996).

A common implementation of the BGP protocol is embodied as a single process executing on a single processor, e.g., a central processing unit (CPU), of the BGP router, while another known implementation provides multiple instances of the BGP process running on a single CPU. In this latter implementation, each BGP instance has its own routing table and chooses its own best path for a given prefix; each instance may further have a different best path for the same prefix. From the perspective of the protocol, each BGP instance is a separate router; yet, each router instance shares the same resources, e.g., the single CPU. Both BGP implementations store and process update messages received from their peer routers, and create and process update messages for transmission (announcement) to those peers. However, the amount of processing time (i.e., band-width) available on the single CPU is finite which, in turn, results in limitations on the number of routes the BGP implementations can handle and limitations on the number of peers/adjacencies that the BGP implementations can support.

Examples of factors that limit the number of adjacencies and routes that a BGP implementation can support include the physical amount of memory in the BGP router. The amount of memory the BGP router can support is important because secondary storage, such as disks, cannot be efficiently used to store update messages given the substantial read/write latencies involved with accessing the disks. Moreover, each adjacency maintained by the router has a certain minimum CPU cost associated therewith. Examples of such cost include sending "KeepAlive" messages at predetermined intervals, processing received update messages, and deciding whether to send update messages to peers whenever a change is made to the routing table.

Each implementation of the BGP protocol requires that a BGP router receive and store, for each routable prefix, a number of paths received from its peers (or generated locally). These paths are then compared using a best path selection algorithm that describes a relationship between paths, i.e., the algorithm specifies how the paths should be compared, along with the order in which they are compared, to select the best path. The best path is then used by the router to forward packets and is announced to the router's peers. Yet as the number of peers increases and the number of prefixes announced (advertised) by each peer increases, the amount of memory needed to store all received paths (i.e., a "load") also increases. It is thus desirable to disperse this received path load among, e.g., various processing elements or nodes of a multi-node system, such that no single node stores all of the paths, thereby limiting the maximum memory needed on a single node.

In general, any relation that is transitive can be dispersed. In this context, transitive means, for example, that if A is less than B and B is less than C, then A is less than C. Using the transitive relation, the best path from each of a number of distinct subsets of paths can be selected and then those selected paths can be compared to select the overall best path. However, the best path selection algorithm (as specified in the BGP standard) is not transitive, i.e., if path A is better than path B and path B is better than path C, it is not necessarily the case that path A is better than path C. In the cases where this non-transitivity can occur, the BGP standard defines the order in which the paths must be compared to make the selection of the overall best path deterministic.

SUMMARY OF THE INVENTION

The present invention overcomes the disadvantages of the prior art by providing a partial best path technique that distributes route selection in a routing protocol implementation on a router. In addition, the technique ensures that announced paths received from peers of the router (i.e., a "load") are compared in a correct order to select best paths that are then used by the router to forward packets and to advertise to the peers. When employed in a distributed architecture, the technique further reduces memory usage. To that end, the partial best path technique enhances a best path selection algorithm executed by the router to enable dispersion of the received path load among nodes or processing elements of the router, while maintaining the ordering requirement of the algorithm. The partial best path technique essentially provides an enhancement to the best path selection algorithm that selects a subset of paths from a plurality of paths, with that subset being the minimal subset needed to select the best paths.

In the illustrative embodiment, a distributed software architecture implements the routing protocol as a set of processes running on one or more processing elements (e.g., processors) of the router. The routing protocol is preferably the Border Gateway Protocol version 4 (BGP). A BGP implementation of the distributed software architecture comprises multiple processes, e.g., BGP speakers, responsible for the majority of processing costs in the BGP implementation. Each BGP speaker preferably executes on a different processor and is generally responsible for, among other things, (i) handling (terminating) one or more BGP peering connections, (ii) storing and "learning" announced paths received from its peers for each prefix, and (iii) performing a first stage of route selection to select a partial best path for each prefix so as to form a set of partial best paths in accordance with the novel partial best path technique.

Each BGP speaker is also responsible for forwarding (downloading) its selected set of partial best paths to another process of the distributed architecture, i.e., a BGP routing information base (RIB) or "bRIB". The bRIB preferably executes on a processor different from that executing a speaker and performs a second stage of route selection to select a set of best paths from among the set of partial best paths downloaded from all of the BGP speakers of the router. The bRIB thereafter downloads each route selected as a best path to another process, i.e., the global RIB, which performs a third (and final) stage of route selection. The bRIB also sends the selected best paths to each BGP speaker, which applies outbound policy (per peer) to those paths prior to transmitting them to the peers.

According to the inventive technique, each speaker selects a subset of partial best paths from among the set of paths it has received from the peers assigned to it. In each speaker, the paths for each prefix are split into several groups such that within each group, the best path algorithm is a transitive relation. That is, for three paths A, B, C from the same group, if path A is better than path B and path B is better than path C, path A is better than path C. An example of how the paths could be grouped is to group the paths according to the autonomous system (AS) from which they were received.

The speaker calculates the best path in each group, using the standard BGP best path algorithm. The speaker then performs a comparison between the best paths from each group that comprises the following steps: (1) discard the path with the lower degree of preference, (2) discard a learned path if the other path is locally originated, (3) discard the path with longer AS_PATH, and (4) discard the path with higher origin. Any paths that have not been discarded after running the algorithm among the best paths from each group form the set of partial best paths for the prefix and are sent by the speaker to the bRIB. The bRIB then uses the standard BGP best path algorithm to select the best path for the prefix from among the partial best paths received from all of the speakers. More generally, the technique enables the speaker to execute the best path algorithm up to the first step which prevents the overall best path algorithm from being transitive.

Advantageously, the novel partial best path technique provides an enhancement to the best path selection algorithm that allows the BGP best path selection process to be distributed among the processing elements of the router. The technique obviates the need to store all announced paths at a single element in order to maintain correctness of the algorithm. It accomplishes this by enabling apportionment of the received path load into subsets that may be quickly (or solely) accessible to the speakers. The speakers may then perform the first stage of route selection (comparison operations) on those subsets of paths such that the bRIB need only compare the outputs of those subset operations. The partial best path technique thus allows the best path selection algorithm to be distributed or performed in multiple stages to thereby reduce memory usage in the router.

The novel technique also has the advantage of "data reduction". By running the first stage of route selection on each subset at each speaker, fewer comparison operations over potentially far fewer paths are needed at the second stage of route selection, even though the bRIB illustratively performs the complete best path selection algorithm over the received partial best paths.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
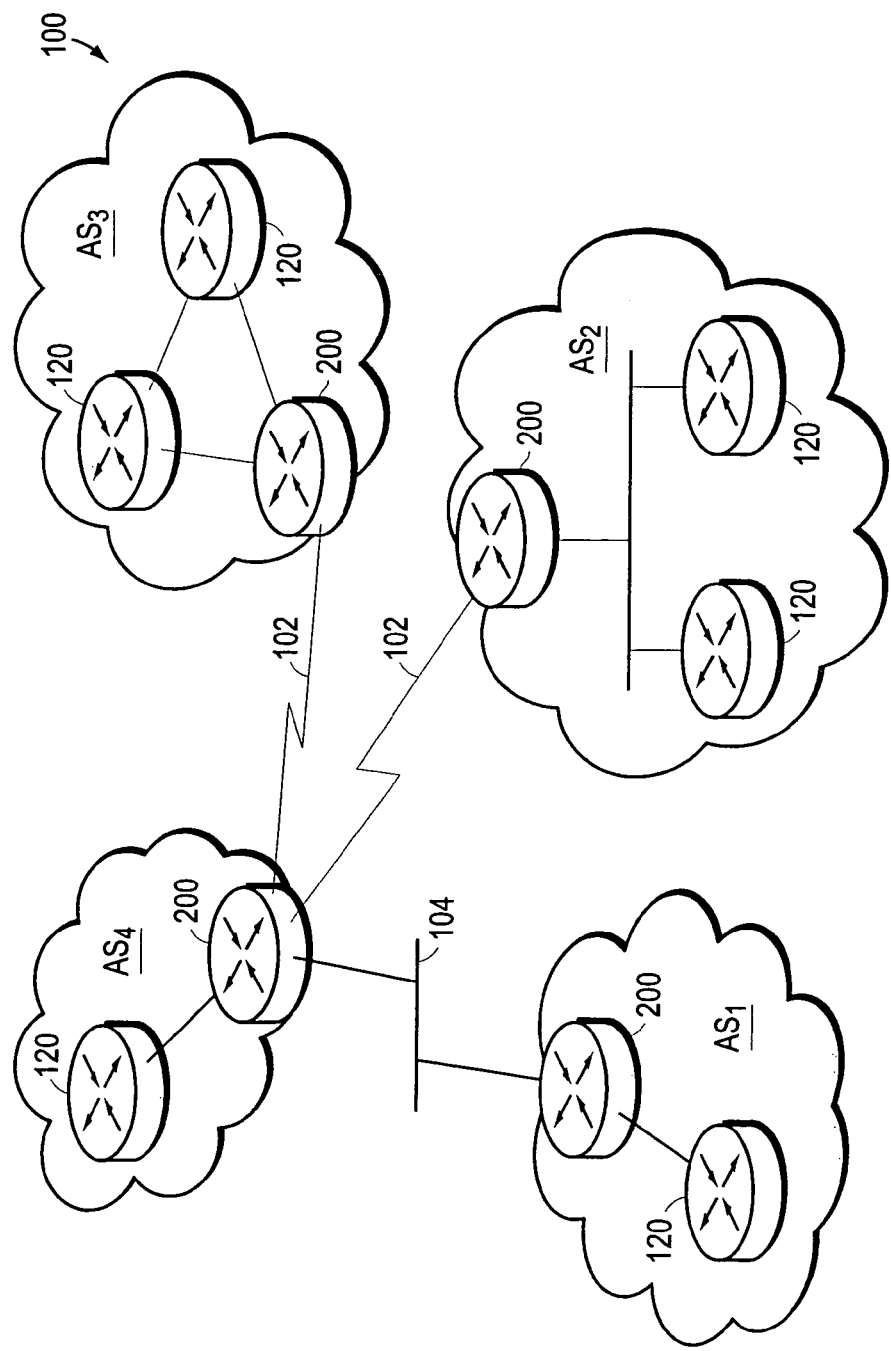
FIG. 1 is a schematic block diagram of a computer network comprising a plurality of autonomous systems interconnected by intermediate nodes, such as Border Gateway Protocol (BGP) interdomain routers.

FIG. 1 is a schematic block diagram of a computer network 100 comprising a plurality of routing domains or autonomous systems interconnected by intermediate nodes, such as conventional intradomain routers 120 and interdomain routers 200. The autonomous systems may include various routing domains ($AS_{1-4}$) interconnected by the interdomain routers. The interdomain routers 200 are further interconnected by networks, such as local area networks (LANs) 104, and point-to-point links 102, such as frame relay links, asynchronous transfer mode links or other serial links. Communication among the routers is typically effected by exchanging discrete data packets or messages in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 2:
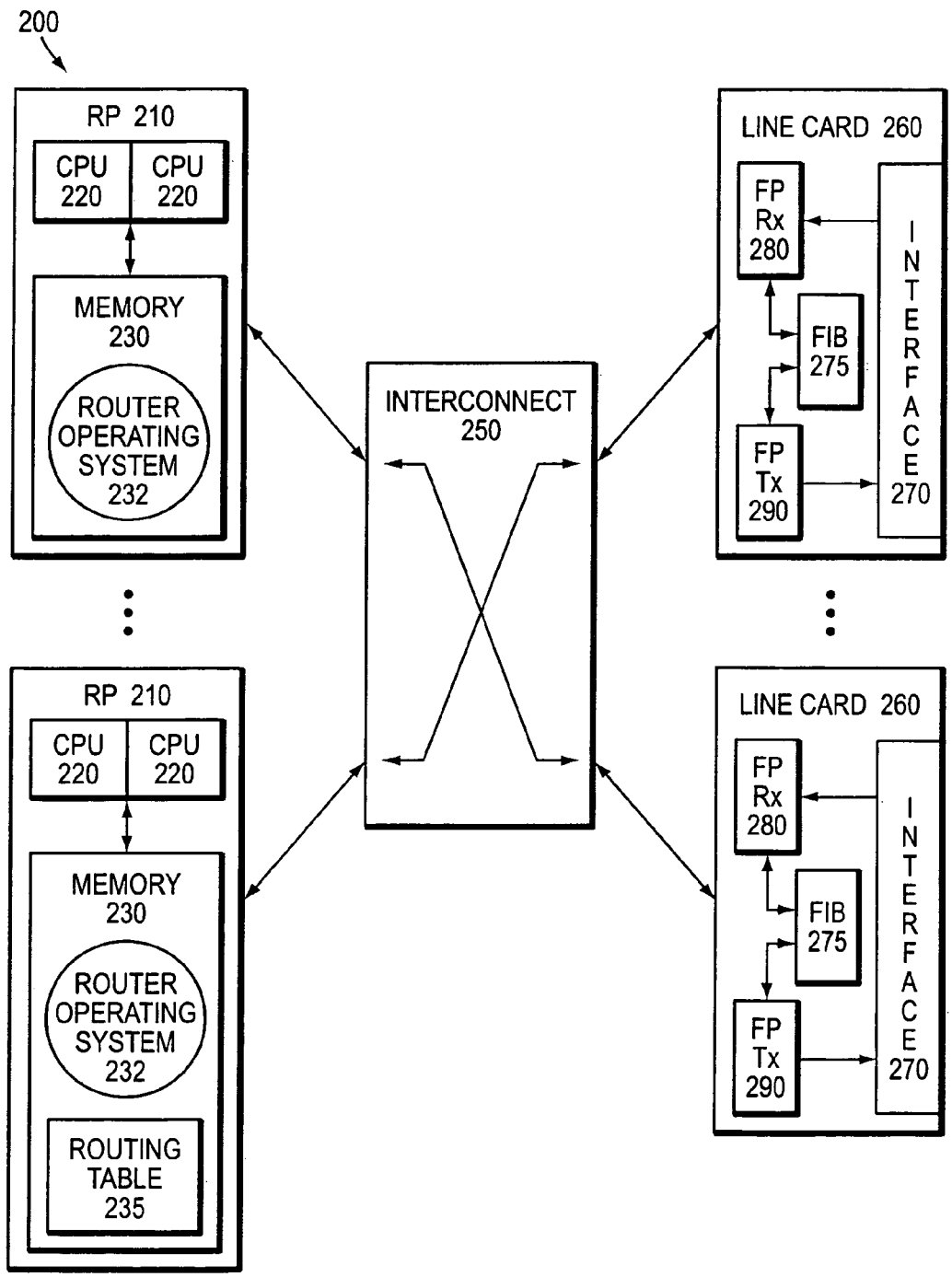
FIG. 2 is a schematic block diagram of an embodiment of an interdomain router that may be advantageously used with the present invention.

FIG. 2 is a schematic block diagram of an interdomain router 200 that may be advantageously used with the present invention. The interdomain router 200 comprises a plurality of loosely coupled processors 210 connected to a plurality of ingress and egress line cards (line cards 260) via an interconnect 250 such as, e.g., a crossbar interconnection or high-speed bus. Those skilled in the art will recognize that other router platforms such as, e.g., a plurality of independent nodes interconnected via a communications fabric as a multi-node cluster, could be used in accordance with the invention. In this context, the term "node" denotes a computer or processor complex comprising processors and an independent memory shared by the processors.

The processors 210 are illustratively route processors (RPs), each having a dedicated memory 230. The memory 230 may comprise storage locations addressable by the processor for storing software programs and data structures associated with the inventive distributed routing protocol architecture. The processor 210 may comprise processing elements or logic for executing the software programs and manipulating the data structures. A router operating system 232, portions of which are typically resident in memory 230 and executed by the processor, functionally organizes the router by, inter alia, invoking network operations in support of software processes (described herein) executing on the processor. It will be apparent to those skilled in the art that other processor and memory means, including various computer readable media, may be used for storing and executing program instructions pertaining to the inventive architecture described herein.

In the illustrative embodiment, each RP comprises two central processing units (CPUs 220), e.g., Power-PC 7460 chips, configured as a symmetric multiprocessing (SMP) pair. The CPU SMP pair is adapted to run a single copy of the router operating system 232 and access its memory space 230. As noted, each RP has a memory space that is separate from the other RPs in the router 200. The processors communicate using an interprocess communication (IPC) mechanism. In addition, each line card 260 comprises an interface 270 having a plurality of ports coupled to a receive forwarding processor (FP Rx 280) and a transmit forwarding processor (FP Tx 290). The FP Rx 280 renders a forwarding decision for each packet received at the router on interface 270 of an ingress line card in order to determine where to forward the packet. To that end, the FP Rx makes use of a forwarding information base (FIB) 275. In the event that the packet is to be forwarded to one of the router's RPs, the FP Rx makes use of an internal FIB, IFIB, to determine to which RP the packet should be forwarded. Likewise, the FP Tx 290 performs lookup operations (using FIB 275) on a packet transmitted from the router via interface 270 of an egress line card.

Figure 3:
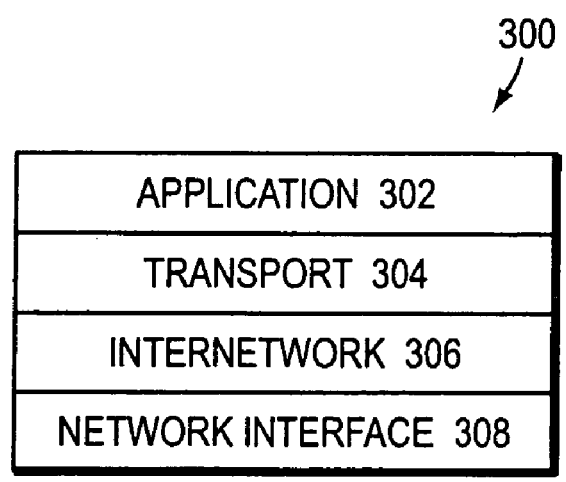
FIG. 3 is a schematic block diagram of a conventional protocol stack, such as the Internet communications protocol stack, within the interdomain router of FIG. 2.

A key function of the interdomain router 200 is determining the next router to which a packet is sent; in order to accomplish such "routing" the interdomain routers cooperate to determine best paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by 4 layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for end-to-end reliability and other service characteristics. An example of such a transport protocol is the TCP protocol, which is implemented by the transport layer 304 and provides connection-oriented, end-to-end reliability services to the upper layer protocols of the Internet architecture. The term TCP/IP is commonly used to denote the Internet architecture.

In particular, the internetwork layer 306 is concerned with how packets are forwarded through the network, although it is not directly concerned with how the FIBs are calculated. An interdomain routing protocol, such as the Border Gateway Protocol version 4 (BGP), is used to perform interdomain routing (for the internetwork layer) through the computer network. The interdomain routers 200 (hereinafter "peer routers") exchange routing and reachability information among the autonomous systems over a reliable transport layer connection, such as TCP. An adjacency is a relationship formed between selected peer routers for the purpose of exchanging routing messages and abstracting the network topology. The BGP protocol "runs" on top of the TCP transport layer 304 to ensure reliable communication of routing messages among the peer routers.

In order to perform routing operations in accordance with the BGP protocol, each interdomain router 200 maintains a routing table 235 that lists all feasible paths to each network. The routers further exchange routing information using routing update messages 400 when their routing tables change. The routing update messages are generated by an updating router to advertise best paths to each of its neighboring peer routers throughout the computer network. These routing updates allow the BGP routers of the autonomous systems to construct a consistent and up-to-date view of the network topology.

Figure 4:
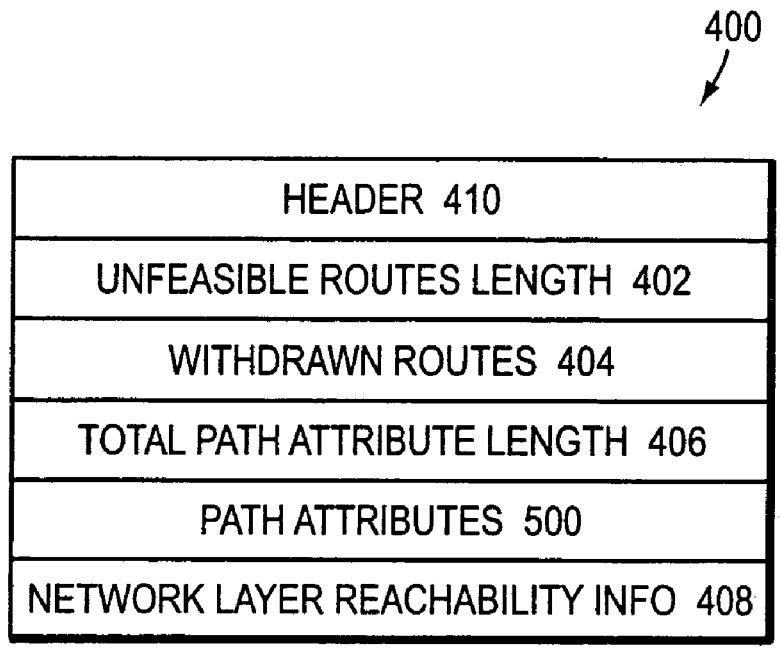
FIG. 4 is a schematic block diagram of an update message, such as a BGP update message that may be advantageously used with the present invention.

FIG. 4 is a schematic block diagram of a conventional BGP update message 400 comprising a plurality of fields appended to a header 410. An unfeasible routes length field 402 indicates the total length of a withdrawn routes field 404, which illustratively contains a list of IP address prefixes for the routes being withdrawn from service. A total path attribute length field 406 indicates the total length of a path attributes field 500 and a network layer reachability information field 408 illustratively contains a list of IP (e.g., IPv4) address prefixes. Note that the combination of a set of path attributes and a prefix is referred to as a "route", while a "path" is an instance of a route announced by a given peer; the terms "route" and "path" may be used interchangeably herein. The format and function of the update message 400 is described in RFC 1771 and *Interconnections, Bridges and Routers*.

Figure 5:
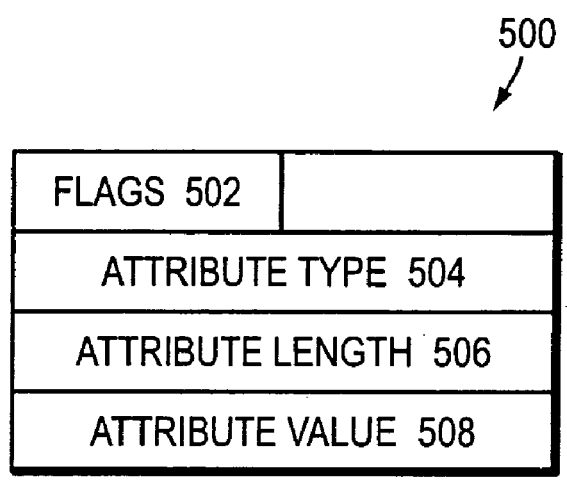
FIG. 5 is a schematic block diagram of a path attributes field of the BGP update message that may be advantageously used with the present invention.

Specifically, the path attributes field 500 comprises a sequence of fields, each describing a path attribute in the form of a triple (i.e., attribute type, attribute length, attribute value). FIG. 5 is a schematic block diagram of the path attributes field 500 comprising a plurality of subfields including a flags subfield 502, an attribute type subfield 504, an attribute length subfield 506 and an attribute value subfield 508. In particular, the attribute type subfield 504 specifies one of a plurality of attribute type codes, examples of which include an autonomous system (AS) path, a multi-exit discriminator (MED) code and a communities attribute, which is a set of opaque 32-bit tags that can apply to a route. The MED is an optional non-transitive attribute having a value that may be used by an updating BGP router's decision algorithm to discriminate among multiple exit points to a neighboring AS, as described further herein. Note that the path attributes are derived from a combination of configuration and protocol (i.e., propagated from the BGP protocol) information.

BGP Architecture

Figure 6:
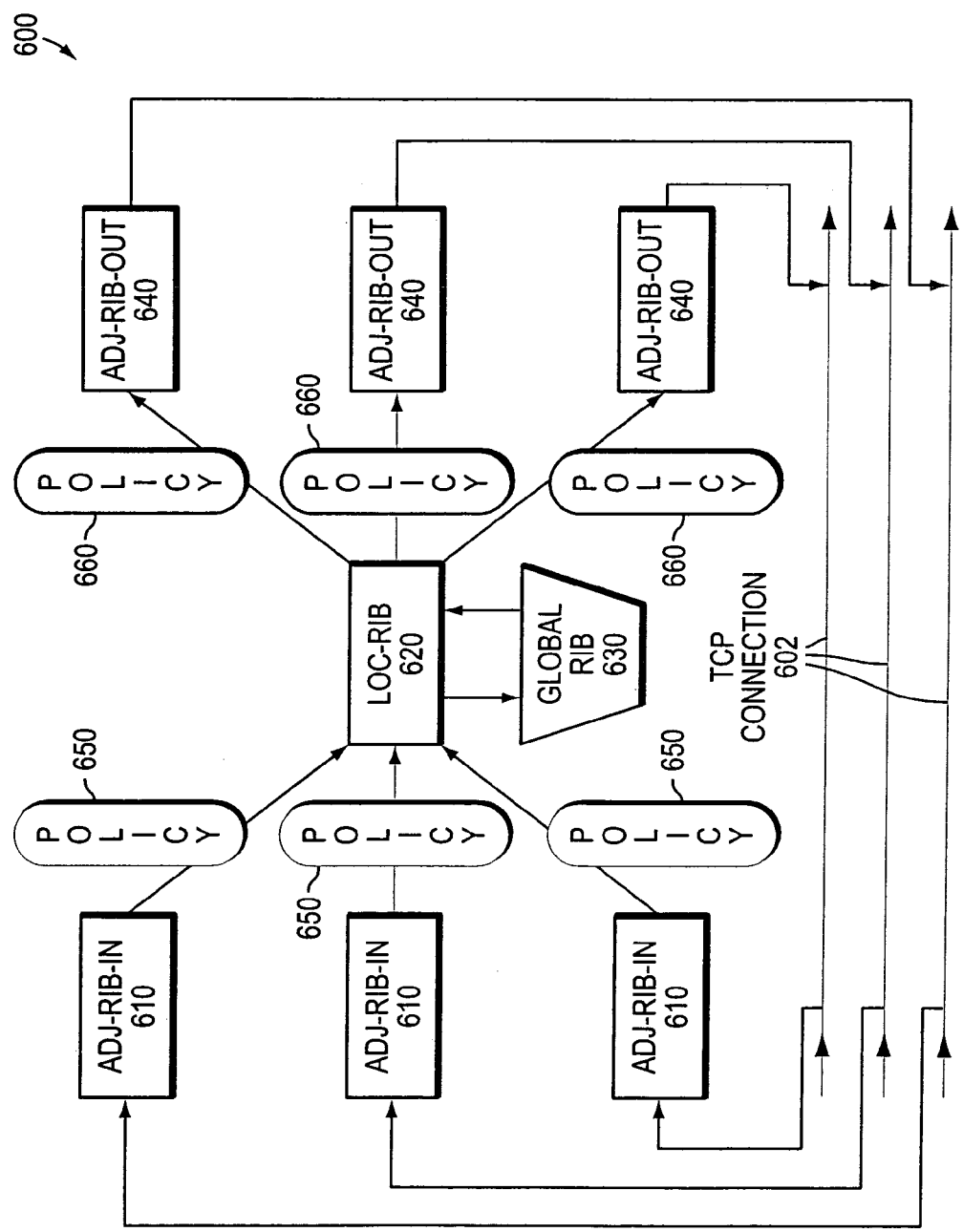
FIG. 6 is a schematic block diagram illustrating the architecture of the BGP protocol.

FIG. 6 is a schematic block diagram illustrating the architecture of the BGP protocol. Peers announce routing updates via TCP connections 602. The BGP protocol "listens" for routing update messages 400 and stores all learned routes for each connection in a BGP database. The BGP database is illustratively organized as Adjacency RIB In (Adj-RIB-In 610), Adjacency RIB Out (Adj-RIB-Out 640) and local RIB (loc-RIB 620). Each peer/TCP connection 602 is associated with an Adj-RIB-In 610 and an Adj-RIB-Out 640. Note that this association is a conceptional data construct; there is typically not a separate Adj-RIB-In/-Out database for each peer.

The BGP protocol runs inbound policy on all routes "learned" for each connection 602 and those routes that match are stored in an Adj-RIB-In 610 unique to that connection. Additional inbound policy 650 (filtering) is then applied to those stored routes, with a potentially modified route being installed in the loc-RIB 620. The loc-RIB 620 is generally responsible for selecting the best route per prefix from the union of all policy-modified Adj-RIB-In routes, resulting in routes referred to as "best paths". The set of best paths is then installed in the global RIB 630, where they may contend with best paths from other protocols to become the "optimal" path ultimately selected for forwarding. Thereafter, the set of best paths has outbound policy 660 run on it, the result of which is placed in appropriate Adj-RIB-Outs 640 and announced to the respective peers via the same TCP connections 602 from which routing update messages 400 were learned. It should be noted that such outbound route advertisement does not necessarily follow global RIB download, i.e., outbound policy could be run before downloading the routes to the global RIB or they could be performed in parallel.

Many of the functions or tasks performed within the BGP protocol are performed on distinct subsets of routing data, independently from one another. These tasks include (1) tracking the state of each peer according to the BGP Finite State Machine (FSM), described in draft-ietf-idr-bgp4-22.txt (Section 8), and responding to FSM events, (2) parsing update messages 400 received from each peer and placing them in an Adj-RIB-In 610 for that peer (Section 3), and (3) applying inbound policy 650 for the peer to filter or modify the received updates in the Adj-RIB-In. The BGP implementation also (4) calculates the best path for each prefix in the set of Adj-RIB-Ins and places those best paths in the loc-RIB 620 (*Section 9*). As the number of peers increases, the number of paths per-prefix typically increases and, hence, this calculation becomes more complex. Additional tasks performed by the BGP implementation include (5) applying outbound policy 660 for each peer on all the selected paths in the loc-RIB to filter or modify those paths, and placing the filtered and modified paths in an Adj-RIB-Out 640 for that peer, as well as (6) formatting and sending update messages 400 to each peer based on the routes in the Adj-RIB-Out for that peer.

Tasks (1), (2), and (3) are defined per peer and operate on routing data learned only from that peer. Performing any of these tasks for a given peer is done independently of performing the same task for any other peers. Task (4) examines all paths from all peers, in order to insert them into the loc-RIB and determine the best path for each prefix. The novel partial best path technique distributes this task by apportioning it into subtasks, as described further herein. Tasks (5) and (6), like tasks (1), (2) and (3), are defined per peer. While both tasks (5) and (6) must access the set of best paths determined in task (4), they generate routing data for each peer independently of all of the other peers. Thus, the autonomy of each subset of the data and the tasks performed on them lend themselves to distribution across processes or threads in an n-way SMP router, or across nodes in a cluster, so long as each task has access to the required data. The required data includes (i) inbound routes from the peer for tasks (1), (2) and (3); (ii) all paths in all the Adj-RIBs-Ins for task (4); and (iii) a set of best paths for tasks (5) and (6).

In the illustrative embodiment, a distributed software architecture is provided that implements a routing protocol, such as BGP, as a set of processes running on a set of processors of a router. The distributed processes cooperate in a manner that internally exploits the distributed set of processors, yet externally presents an appearance/behavior of a single routing protocol process communicating with its peers in the network. The distributed nature of the architecture is achieved without altering the fundamental BGP routing protocol, but by apportioning certain functions/tasks of the protocol among various processes in the multiprocessor router.

BGP Implementation of Distributed Software Architecture

Figure 7:
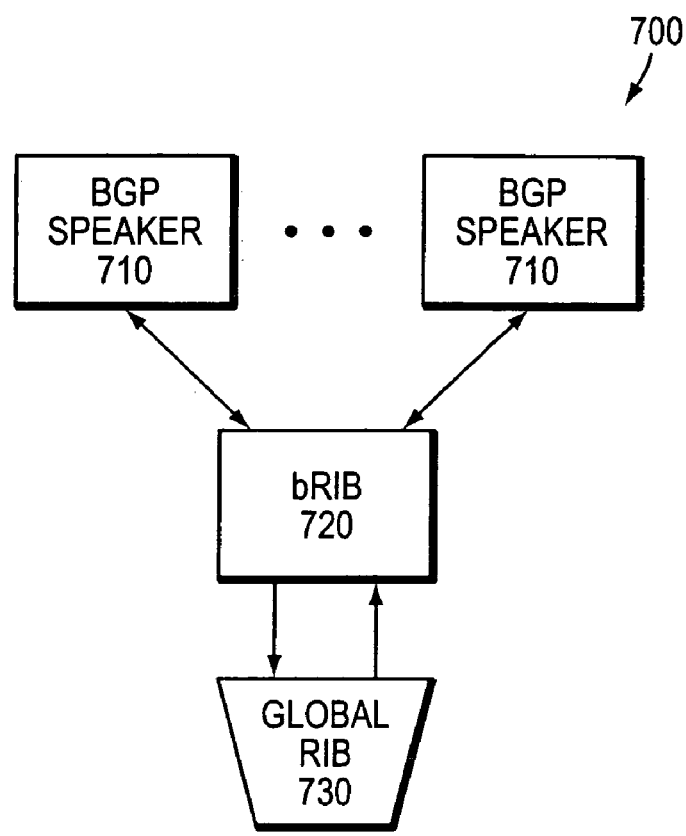
FIG. 7 is a schematic block diagram illustrating a BGP implementation of a distributed software architecture according to the present invention.

FIG. 7 is a schematic block diagram illustrating a BGP implementation 700 of the distributed software architecture. The illustrative distributed BGP implementation comprises multiple processes including one or more BGP speaker processes 710, each of which is responsible for managing a set of routing peers, and a BGP Routing Information Base ("bRIB") process 720. The BGP speakers 710 are responsible for the majority of processing costs in the BGP implementation. The use of multiple BGP speakers provides a substantial scaling feature by enabling cost effective processing of tasks, such as packet reception, packet transmission and packet formatting. Each BGP speaker is generally responsible for, among other things, (i) handling (terminating) one or more BGP peering connections, (ii) storing and "learning" announced paths received from its peers for each prefix, and (iii) performing a first stage of route selection to select partial best paths for each prefix so as to form a set of partial best paths in accordance with a partial best path technique described herein.

Specifically, each BGP speaker (i) establishes and maintains a reliable TCP connection to each routing peer and handles FSM events for the peer, (ii) receives and processes update messages 400 received from the peers to learn a number of announced paths for each prefix, (iii) applies inbound policy 650 to the learned paths, (iv) selects partial best paths for each prefix to form a set of partial best paths that is placed in the Adj-RIB-In 610 and forwards that set of partial best paths to the bRIB 720, and (v) receives at least one best path for each prefix from the bRIB 720 and advertises it to each routing peer after applying outbound policy 660 for that peer. In the distributed software architecture, policy computations are handled by a separate software component, e.g., a library, to which the BGP speaker "binds", although these computations could alternately be implemented "in-line" as part of the BGP code. Each BGP speaker 710 is illustratively a multithreaded process; policy is thus preferably handled as a library function call initiated by one of the BGP speaker threads. As such, policy computations occur within the BGP process space.

Policy may be used to limit the reception or distribution of routing information from and to a BGP speaker (i.e., a form of access control or filtering) and to manipulate the data in the routing information. Examples of routing policy include "match if prefix is 10.0.0.0/8" or "match if prefix starts with 192.168 and AS path starts with 690". One or both of these policies may be applied to filtering on a peering session in an inbound fashion, such that the BGP speaker only accepts those routes that meet the criteria of the policy. Policy can also apply to filtering in an outbound fashion, such that only routes that match one of the policies are sent to the peers. Moreover, policy may be used for "go or no-go" decisions on whether to pass a route and, further, whether to manipulate the route in some fashion. For example, assume a policy "if the route contains AS number 1800, then add community 42 to the route". This manipulates the data comprising the route according to the policy control.

Several processors or nodes 210 may be used to run the speakers 710, wherein each processor runs entirely independently of the other processors. One reason policy is run in the BGP speakers is that policies are specified "per peer". Furthermore, the routes as modified per policy serve as input to the best path calculation which, in turn, examines attributes that may have been modified by policy. Thus, in an implementation that employs partial best path, policy must be applied prior to calculating a partial best path as the policy affects the outcome of the best path calculation. Another reason for distributing functions, such as policy, to the BGP speaker 710 as opposed to handling it in the bRIB 720 is that executing the policy code is one of the most expensive operations in the entire BGP protocol. As noted, there is one bRIB 720 in the distributed software architecture, but potentially many speakers 710. By distributing the policy code function/task to the speakers, that task can be apportioned into many smaller subtasks and the collective strength of the multiple processors may be applied to execute the code. In addition, each BGP speaker is illustratively assigned many routing peers (e.g., 1000) to manage and every routing peer configured on the router is assigned to one speaker. Therefore, as the number of BGP routing peers increases, extra processors can be added to the router to handle the extra processing needed.

Each BGP speaker 710 is responsible for forwarding (downloading) its selected set of partial best paths to the bRIB 720, as described further herein. The bRIB is illustratively a process executing on a processor (RP 210) of the BGP router 200 that may be separate from those processors functioning as speakers; alternatively, the bRIB may share a processor with one of the speakers. It will be understood to those of skill in the art that the present invention may operate on other implementations, including implementations wherein more than two (or all) processes of the distributed BGP architecture run on the same processor.

The bRIB process 720 (i) receives and stores partial best paths received from each speaker process, (ii) performs a second stage of route selection to select a best path for each prefix from among the selected set of partial paths (prefixes) downloaded from all of the BGP speakers to thereby form a set of best paths, (iii) installs the set of best paths into a system routing table (i.e., global RIB 630) and (iv) sends the selected best paths back to all the speakers 710 so that they can be transmitted (advertised) to their routing peers. It should be noted that the speakers must not announce the paths/routes they learn from the bRIB back to the bRIB. Moreover, since only the partial paths in all Adj-RIBs-Ins 610 are sent to the bRIB 720, the correct best path for each prefix is selected by the bRIB, according to the BGP protocol standard.

The global RIB 730 illustratively maintains a "system" routing table for the router. The system routing table ("routing table 235") is a database that contains routing information used to construct a forwarding table of the FIB 275 used by the FPs of the router 200 when performing forwarding decisions on packets. The routing table 235 typically denotes a database containing all available routes, including ones that have been selected for forwarding (optimal paths) as well as backup routes that are not currently selected for forwarding, while the forwarding table denotes those optimal best paths that have actually been selected for forwarding.

The loc-RIB 620 denotes a table storing routes that are similar to the routes in the forwarding table. The bRIB 720 maintains the loc-RIB 620, including processing and downloading to the global RIB 730 each route/path in the loc-RIB selected as the best path. The global RIB 730 maintains a copy of those downloaded best paths, along with other best paths downloaded from other routing protocols, in order to perform a third (and final) stage of route selection to select an optimal best path for each prefix and thereby form a set of optimal best paths/routes for installation in the routing table 235. The global RIB 730 preferably interacts with another software component to download those optimal paths/routes to all the line cards 260 of the router 200, each of which maintains its own copy as a forwarding table.

In the illustrative embodiment, the distributed BGP software architecture is organized such that each BGP speaker process 710 executes on a different RP 210. In addition, the bRIB process 720 typically executes on a RP 210 separate from an RP executing a BGP speaker 710, to thereby avoid contention between the bRIB and speaker for shared resources. Illustratively, the bRIB 720 executes on the same RP(s) 210 as the global RIB 730, but this is not a requirement and those processes could execute on different RPs. However, when configuring the bRIB 720 to execute on the same RP as the global RIB 730, the performance of the router increases because the processes communicate, e.g., with respect to route selection, via message exchanges that occur faster on the same RP 210 rather than across the switch fabric 250. It will be understood to those skilled in the art that alternative configurations are contemplated, including allowing all processes to run on the same RP 210, as well as allowing the bRIB and global RIB to be the same process.

As noted, the BGP processes of the distributed software architecture cooperate in a manner that externally presents an appearance/behavior of a single routing protocol process despite having those processes run on various RPs 210 of the router. To make the distributed RPs appear as a single-processor BGP, a local packet transport service is used to distribute TCP sessions to the RPs, even TCP sessions with identical destination IP addresses. Thus, from the perspective of an "outsider", all RPs share the same IP address or addresses. This is different from the typical way of dealing with a collection of processors/routers, where each would have its own unique IP address. An example of a local packet transport service that may be advantageously used with the present invention is described in U.S. patent application Ser. No. 10/293,180, titled System and Method for Local Packet Transport Services within Distributed Routers, filed on Nov. 12, 2002.

Route Selection

Route selection is the point at which the various components (BGP speaker, bRIB and global RIB) of the distributed software architecture cooperate. In particular, each speaker 710 and bRIB 720 executes part of a route selection procedure. In the illustrative embodiment, the route selection procedure includes a BGP best path selection algorithm, i.e., a path vector algorithm. According to the BGP standard, every BGP router announces to all of its peers its set of best paths. As a result of these announcements, a particular router may gather from its peers two or more routes for some prefixes/networks. For example, the router may have learned two or more different ways to reach network 10.1.1.0/24; the best path selection computation is a way of choosing one of those routes as "best" and using it to render forwarding decisions for the router. Note that in the case of multi-path BGP, more than one path may be chosen as best by the algorithm. To be considered as multi-paths, the paths must be equal up to a predetermined point (e.g., Step 7) of the best path selection algorithm; thus, the partial best path technique described herein automatically includes any candidate multi-paths. However, it should be further noted that these multiple chosen paths are only downloaded to the global RIB and, in the illustrative embodiment, there is only ever one best path for each prefix sent back to the speakers. It will be understood to those skilled in the art that other alternatives are contemplated, including sending some or all of the multiple chosen paths back to the speakers.

Broadly stated, the illustrative BGP best path selection algorithm comprises the following steps:

1. Prefer the path with the largest LOCAL_PREF;
2. Prefer the path that was locally originated, i.e., via local aggregation or via an interior gateway protocol (IGP);
3. Prefer the path with the shortest AS_PATH;
4. Prefer the path with the lowest origin type, e.g., IGP is lower than exterior gateway protocol (EGP), and EGP is lower than INCOMPLETE;
5. Prefer the path with the lowest MED among routes with identical AS;
6. Prefer external (eBGP) over internal (iBGP) paths;
7. Prefer the path with the lowest IGP metric to the BGP next hop;
8. Prefer the route coming from the BGP router with the lowest router ID (BGP identifier);
9. If the originator or router ID is the same for multiple paths, prefer the path with the minimum cluster ID length; and
10. Prefer the path coming from the lowest neighbor (peer) address.

The present invention is directed to a partial best path technique that distributes route selection in a routing protocol (BGP) implementation on a router. In addition, the technique ensures that announced paths received from peers of the router (i.e., a "load") are compared in a correct order to select best paths that are then used by the router to forward packets and to advertise to the peers. When employed in a distributed architecture, the technique further reduces memory usage. To that end, the partial best path technique enhances a best path selection algorithm, such as the BGP best path selection algorithm, executed by the router to enable dispersion of the received path load among nodes or processing elements of the router, while maintaining the ordering requirement of the algorithm. The partial best path technique essentially provides an enhancement to the best path selection algorithm that selects a subset of paths from a plurality of paths, with that subset being the minimal subset needed to select the best paths.

According to the technique, each BGP speaker selects a subset of partial best paths from among the set of paths it has received from the peers assigned to it, as follows. In each speaker, the paths for each prefix are split into several groups such that within each group, the best path algorithm is a transitive relation. That is, for three paths A, B, C from the same group, if path A is better than path B and path B is better than path C, path A is better than path C. An example of how the paths could be grouped is to group them according to the autonomous system (AS) from which they were received.

The speaker calculates the best path in each group, using the standard BGP best path algorithm. The speaker then performs a comparison between the best paths from each group that comprises the following steps: (1) discard the path with the lower degree of preference, (2) discard a learned path if the other path is locally originated, (3) discard the path with longer AS_PATH, and (4) discard the path with higher origin. Any paths that have not been discarded after running the algorithm among the best paths from each group form the set of partial best paths for the prefix and are sent by the speaker to the bRIB. The bRIB then uses the standard BGP best path algorithm to select the best path for the prefix from among the partial best paths received from all of the speakers. More generally, the technique enables the speaker to execute the best path algorithm up to the first step which prevents the overall best path algorithm from being transitive.

As noted, the standard BGP best path algorithm is not transitive and, hence, it imposes some restrictions on the order in which paths are compared so as to ensure that the outcome is deterministic. The ordering requirement is that each step of the algorithm is completed for all paths before a next step of comparison is performed for any pair of paths not eliminated in a previous step. This seems to imply that all paths must be sent to the bRIB after Step 1, since that is the only way Step 1 could be completed for all paths (including those from different speakers) before starting Step 2. However, failure to compare some paths at an earlier step before proceeding to the next step could only affect the final outcome if it results in a path not being eliminated at that step, when it otherwise would have been, and that path can then proceed to become the overall best path.

Where the algorithm is transitive, this can never happen (given that for any pair of paths, the steps are always performed in the correct order). To illustrate, consider the situation in which two paths, A and B, are not compared at an earlier step before path B is compared with another path C at a later step. If paths A and B had been compared at the earlier step, path B would have been eliminated in favor of path A; that is, path A is better than path B. Now, when paths B and C are compared, if B is better than C, then (from transitivity) path A is also better than path C and, despite the order in which the comparisons occur, path A is correctly selected as the overall best path. If path C is better than path B, then regardless of the order of comparisons, path B is eliminated the first time it is compared with either of the other paths, and the overall best path is the better of paths A and C. In either case, path B cannot proceed to become the overall best path.

Therefore, where the algorithm is transitive, it is safe for the speaker to do comparisons at later steps, even though not all paths have been compared at the earlier steps (because the paths from different speakers have not been compared). When comparing paths originating in the same AS, the algorithm is transitive in its entirety and a speaker can run the standard BGP best path algorithm for each group of paths originating from the same AS. When comparing paths originating in different autonomous systems, the algorithm is only transitive for Steps 1–4. This means that the speaker can compare the best path from each group as far as Step 4, but any paths not eliminated by then must be sent to the bRIB as partial best paths. The bRIB is able to compare the partial best paths from all the different speakers at each step before proceeding to the next step, thereby fulfilling the ordering requirement.

The reason that the algorithm is not transitive after Step 4 when comparing paths from different autonomous systems is that Step 5 (MED comparison) only applies when comparing paths from the same AS. When comparing paths from different autonomous systems, Step 5 is skipped. This means it is possible to have paths A, B, and C, where A and B are from one AS and C is from a different AS and, according to the algorithm, A is better than B, B is better than C, but C is better than A. This would happen, for example, with paths A and B from one AS and path C from a different AS if path A had MED 10 and IGP metric 30, path B had MED 20 and IGP metric 10, and path C had MED 20 and IGP metric 20, with all other parameters being the same for all three paths and recalling that for both MED (Step 5) and IGP metric (Step 7), the path with the lower value is preferred. Note that if all three paths were from the same AS, transitivity would be restored as path A would then be better than path C.

Operationally, each BGP speaker runs Steps 1–4 over all routes/paths stored in its Adj-RIB-In 610. Any path that "loses" before Step 5 is eliminated from a candidate group of partial best paths. Of the remaining partial best paths, the paths from each distinct neighbor AS are considered as a group in Step 5. For each distinct neighbor AS, only one single path is chosen as a partial best path. The surviving set of partial best paths for this first stage of route selection is downloaded to the bRIB 720, which collects all such partial best paths from all speakers 710 and runs at least Steps 5–10 of the BGP best path selection algorithm over them to compute a set of final best paths. It should be noted that the bRIB may perform just Steps 5–10 only in the case where it compares paths received from the same speaker. When comparing paths received from different speakers, the bRIB 720 must perform the full BGP best path selection algorithm.

The loc-RIB 620 conceptually comprises the output of the BGP selection algorithm; thus the bRIB 720 and loc-RIB 620 are not quite identical. The bRIB 720 contains all the partial best paths that are considered for selection into the loc-RIB 610; the bRIB then performs the second stage of route selection. Note that the bRIB 720 preferably runs all steps (Steps 1–10) of the BGP best path selection algorithm start to finish, because a particular speaker may have selected a path as local partial best, which then loses to another speaker's local partial best path at, e.g., Step 2 of the algorithm. Nevertheless, the bRIB 720 still benefits from the limited computation performed at each speaker 710 because it does not have to run the entire selection algorithm over as many paths nor does the speaker have to transport as many paths to the bRIB on implementations where the speaker and bRIB are not running on processors 210 where paths are stored in shared memory, quickly accessible by both the speaker and bRIB. Note also that the bRIB may skip Steps 1–4 of the algorithm when comparing paths received from the same speaker, as described above.

Once the bRIB computes the loc-RIB 620, the next function in the route selection procedure is to generate the forwarding tables of FIB 275 for the line cards 260. The bRIB abstracts the final best paths/routes of the loc-RIB and downloads them to the global RIB 730. Since there may be protocols other than BGP running on the router 200, the global RIB gathers abstracted routes from other routing protocols, e.g., OSPF and IS—IS routes, as well as locally configured routes and static routes, and performs its own (third and final) stage of route selection to select a set of optimal best paths for all routing protocols executing on the router. For example, the global RIB 730 examines a BGP final best path/route and determines whether it is the only route for a particular destination; if so, the global RIB selects that route as an optimal best path. However, if there are final best paths to a destination offered from both BGP and, e.g., OSPF, (a "conflict") the global RIB must select one.

Specifically, the global RIB 730 selects optimal best paths from among various protocols where there may be conflicts between the outputs of the different protocols. By examining the route selection outputs from the different protocols, the global RIB 730 is the final arbiter of which routes get selected as optimal paths to destinations. Routes with different destinations are never in conflict, so the problem arises when there are two or more routes that have the same destination. For example, assume there is a route from OSPF for 10.0.0.0/8 and a route from BGP for 10.0.0.0/8; the global RIB must then select one for installation in the routing table 235. The criteria that the global RIB 730 may apply to determine which route to install may be, e.g., always use OSPF over BGP. Once the global RIB has rendered its conflict resolution, it essentially selects routes for installation in the FIB. Other software components in the router then download the routes from the global RIB into the FIB 275 of the line cards 260.

When generating update messages 400 to send to its peers, each BGP speaker 710 may apply policy configured for redistribution of routes from other protocols into BGP; redistribution of routes occurs by the global RIB 730 uploading (communicating) those optimal best paths into the bRIB 720. For example, redistribution may occur from OSPF into BGP, which means all active OSPF optimal best paths (those that have made it into the global RIB) are copied into the BGP routing table of the bRIB 720. These redistributed protocol routes do not supersede those routes in the loc-RIB, but rather augment them to essentially factor into the BGP best path selection algorithm. Note that the best paths in the loc-RIB that have been downloaded to the global RIB are not thereafter uploaded back to the bRIB. Moreover, if a redistributed path is selected as the best path by the bRIB and installed into the loc-RIB 620, it is not then downloaded to the global RIB (since that is where it came from originally).

The bRIB 720 transmits a copy of the loc-RIB 620 to each BGP speaker 710, which performs outbound policy operations on those loc-RIB best paths/routes. As a result of the policy operations, the speaker computes a subset of routes for the Adj-RIB-Out 640 for a peer router. The BGP speaker then creates one or more BGP update messages 400 based on internal data representations of the routes in the Adj-RIB-Out 640 and transmits those update messages to the peer. As noted, the BGP protocol is an incremental protocol in that the update messages are incremental. Despite having an Adj-RIB-Out 640 with many (e.g., a million) routes, only routes that have changed (including withdrawn) are included in the update messages. The BGP speaker 710 may also perform some kind of manipulation/change to the data before transmitting it in the update messages 400. Once created, the BGP updates messages are passed to the TCP layer and other lower layers of the network protocol stack, where the messages are formatted and transmitted over the communication links as packets to the peer routers.

Figure 8:
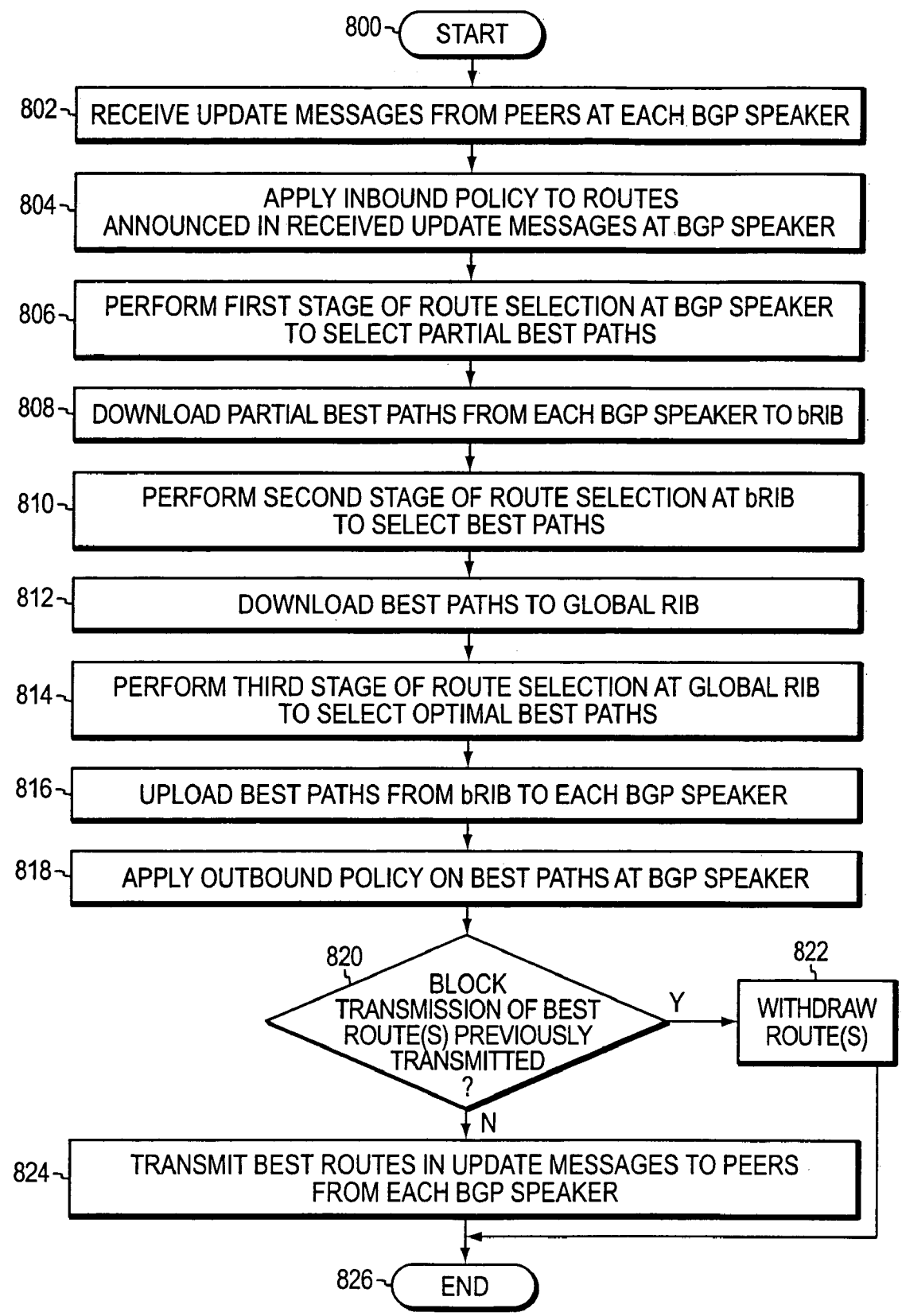
FIG. 8 is a flowchart illustrating a sequence of steps pertaining to a partial best path technique according to the present invention.

FIG. 8 is a flowchart illustrating a sequence of steps pertaining to the partial best path technique according to the present invention. The technique is illustratively described as operating on the distributed BGP architecture in response to update messages 400 received at and transmitted from the router 200. These update messages are, in turn, used in connection with route selection in the router. The sequence starts at Step 800 and proceeds to Step 802 where each BGP speaker receives update messages 400 from its peers and, in Step 804, processes those received messages by applying inbound policy to the routes announced in those messages. At Step 806, the speaker performs a first stage of route selection to select partial best paths and installs those paths in its Adj-RIB-In 610 as described herein. The partial best paths are then downloaded to the bRIB 720 in Step 808.

The bRIB, in turn, examines all the partial best paths that it receives from the various BGP speakers and, in Step 810, performs a second stage of route selection to select best paths/routes (on a per prefix basis). In Step 812, the bRIB 720 downloads the selected best paths/routes to the global RIB 730 for the router which, in Step 814, performs a third (and final) stage of route selection to select optimal best paths/routes. In Step 816, the bRIB uploads those best paths/routes calculated in Step 810 to each BGP speaker. In Step 818, the BGP speaker 710 performs further processing by applying outbound policy on those best paths/routes and, in Step 820, determines whether the applied policy blocks transmission of one or more routes that had been previously transmitted. If so, those routes are withdrawn from service using the withdrawn routes field 404 of update message 400 (Step 822). Otherwise, the speaker transmits (advertises) the best routes to its peers as update messages in Step 824 and the sequence ends at Step 826.

It should be noted that the novel partial best path technique, like the best path selection algorithm, is a sorting algorithm that sorts the paths in an order as defined by the algorithm. Thus, there are other ways in which the novel technique may be used. In the illustrative embodiment, the partial best path technique is described in the context of a distributed BGP implementation that reduces the amount of data forwarded from each speaker to the bRIB. That is, the illustrative implementation reduces the number of paths that must be forwarded from each speaker to the bRIB and, as such, the number of paths that ultimately have to be compared. However, the invention may also apply to a non-distributed environment or other environment where the characteristics of the technique can be advantageously used.

For example, alternate embodiments that may be advantageously used with the present invention include non-distributed implementations of a SMP computer environment and a multi-threaded processing environment with multiple threads of execution for the BGP process. The SMP computer environment may be configured as multiple processing elements, such as processors, configured as stages of a pipeline, whereas the multiple threads may share a common memory and processing element having multiple "cores" with each core having an arithmetic logic unit, a set of registers, instruction decode unit, etc. Alternatively, the multi-threaded environment may comprise two single core processors, each having one thread of execution. Yet another alternate embodiment may comprise an array of first processors configured to perform the first stage of route selection with a second processor performing the second stage.

For each alternate embodiment, the partial best path technique may allow apportionment of the best path selection algorithm into a number of (e.g., 2) stages to thereby enable performance of route selection in parallel instead of serially, as in the prior art. That is, a first processor (or first thread) runs a first stage of partial best path route selection to select a set of partial best paths and a second processor (or second thread) runs a second stage of full best path route selection over the partial best paths to select a set of best paths. Whereas the inventive technique reduces memory use in a distributed implementation because the second stage does not need to access all of the memory of the first stage, in a non-distributed implementation, the technique allows the use of multiple processors or threads by apportioning route selection into partial best path and full best path comparison operations. This, in turn, allows the multiple processors or threads to execute the algorithm substantially simultaneously and use the router resources more efficiently to effect a performance improvement.

Advantageously, the novel partial best path technique provides an enhancement to the best path selection algorithm that allows the BGP best path selection process to be distributed among the processing elements of the router. The technique obviates the need to store all announced paths at a single element while maintaining correctness of the algorithm. By enabling apportionment of the received path load into subsets, the load may be stored in memory that is quickly (or solely) accessible to the speakers. The speakers may then perform the first stage of route selection (comparison operations) on those subsets of paths such that the bRIB need only compare the outputs of those subset operations. The partial best path technique thus allows the best path selection algorithm to be distributed or performed in multiple stages to thereby reduce memory usage in the router.

In particular, implementation of the partial best path technique on the distributed software architecture allows the workload to be apportioned among multiple processes, effecting a more scalable BGP implementation capable of allowing a user the ability to dedicate resources to particular groups of peers, while maintaining the external appearance of a single BGP protocol instance. As noted, the BGP implementation may be further apportioned among several processors in a multiprocessor router (or nodes in a multi-node cluster), such that the total required processing is distributed among the processors, instead of concentrated on a single processor. As the number of routing peers increases, additional processors can be added to the router to handle the extra processing required, thereby avoiding overloading of a single processor and, hence, adversely affecting the convergence time of the protocol.

The novel technique also has the advantage of "data reduction". By running the first stage of route selection on each subset at each speaker, fewer comparison operations are needed at the second stage of route selection, even though the bRIB illustratively performs the complete best path selection algorithm over the received partial best paths.

While there has been shown and described embodiments of a partial best path technique that distributes route selection in a routing protocol implementation on a router, it is to be understood that various other adaptations and modifications may be made within the spirit and scope of the present invention. For example, in an alternate embodiment of the invention, a configuration option ("always compare MED") is provided that increases the efficiency of the BGP best path selection algorithm. If the configuration option is enabled, the MED attribute is compared with all routes, regardless of the AS from which the routes were learned. In that case, each BGP speaker 710 can run the entire best path selection algorithm. This option substantially reduces the amount of data that the bRIB 720 must process, because each speaker downloads only one path/route for each prefix and not (potentially) several routes, as it must when typical MED behavior is employed. However, if multi-path is also enabled, it is not sufficient to download just one path for each prefix; each speaker must download all candidate multi-paths (up to the maximum configured for multi-path) to the bRIB.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various processes described herein, can be implemented as software, including a computer-readable medium having program instructions executing on a computer, hardware, firmware, or a combination thereof. In addition, it is understood that the data structures described herein can include additional information while remaining within the scope of the present invention. Furthermore, the inventive distributed software architecture may apply generally to distance vector routing protocols, e.g., IGRP, EIGRP or RIP, as well as to a label distribution protocol (LDP). Accordingly this description is to be taken only by way of example and not to otherwise limit the scope of the invention. Therefore, it is the object of the appended claims to cover all such variations and modifications as come within the true spirit and scope of the invention.

What is claimed is:

1. A system adapted to distribute route selection in an implementation of a routing protocol executing on a router of a computer network, the system comprising:
   a first process of the routing protocol configured to receive announced paths from peers of the router and perform a first stage of route selection to select partial best paths;
   a second process of the routing protocol configured to perform a second stage of route selection to select best paths in response to the partial best paths forwarded by the first process, the second process further configured to send the selected best paths to the first process for announcement to the peers.

2. A method for distributing route selection in an implementation of a routing protocol executing on a router of a computer network, the method comprising the steps of:
   receiving announced paths from peers of the router at a plurality of first processes of the routing protocol;
   performing a first stage of route selection at the first processes to select partial best paths;
   forwarding the partial best paths to a second process of the routing protocol;
   performing a second stage of route selection at the second process to select best paths; and
   sending the selected best paths to the first processes for announcement to the peers.

3. The method of claim 2 wherein the routing protocol is a Border Gateway Protocol (BGP) and wherein route selection includes a BGP best path selection algorithm.

4. The method of claim 3 wherein the first processes are speakers and wherein the second process is a BGP routing information base (bRIB).

5. The method of claim 4 further comprising the steps of:
   providing a plurality of first processors configured to run the speakers; and
   providing a second processor configured to run the bRIB.

6. The method of claim 4 wherein the step of performing the first stage of route selection comprises the step of splitting the announced paths for each prefix into a plurality of groups such that within each group, the BGP best path selection algorithm is a transitive relation.

7. The method of claim 6 wherein the step of splitting comprises the step of grouping the paths according to an autonomous system (AS) from which they were received.

8. The method of claim 7 wherein the step of performing the first stage of route selection further comprises the step of calculating a best path in each group using the BGP best path selection algorithm.

9. The method of claim 8 wherein the step of performing the first stage of route selection further comprises the step of performing a comparison between each best path from each group.

10. The method of claim 9 wherein the step of performing a comparison further comprises the steps of:
selecting a path with a highest degree of preference;
selecting a locally originated path over a learned path;
selecting a path with shortest $AS_{13}$ path; and
selecting a path with lowest origin.

11. The method of claim 10 wherein the step of performing the first stage of route selection further comprises the step of forming a set of partial best paths forwarded to the bRIB from any paths that have not been discarded by running the algorithm at each speaker.

12. The method of claim 11 wherein the step of performing the second stage of route selection comprises the step of using the full BGP best path selection algorithm to select a best path per prefix from among the partial best paths received from all speakers.

13. A system adapted to distribute route selection in an implementation of a routing protocol executing on a router of a computer network, the system comprising:
a plurality of first processes of the routing protocol configured to receive announced paths from peers of the router and perform a first stage of route selection to select partial best paths;
a second process of the routing protocol configured to perform a second stage of route selection to select best paths in response to the partial best paths forwarded by the first processes, the second process further configured to send the selected best paths to the first processes for announcement to the peers.

14. The system of claim 13 wherein the routing protocol is a distance vector routing protocol.

15. The system of claim 13 wherein the routing protocol is a Border Gateway Protocol (BGP) and wherein route selection includes a BGP best path selection algorithm.

16. The system of claim 15 wherein the first processes are speakers and wherein the second process is a BGP routing information base (bRIB).

17. The system of claim 16 further comprising:
a plurality of first processors configured to run the speakers; and
a second processor configured to run the bRIB.

18. The system of claim 17 wherein each speaker splits the announced paths for each prefix into a plurality of groups such that within each group, the BGP best path selection algorithm is a transitive relation.

19. The system of claim 18 wherein the groups are organized according to an autonomous system (AS) from which they were received.

20. The system of claim 19 wherein each speaker further calculates a best path in each group using the BGP best path selection algorithm.

21. The system of claim 20 wherein each speaker further performs a comparison between each best path from each group.

22. The system of claim 21 wherein the speaker performs the comparison by (1) discarding the path with the lower degree of preference, (2) discarding a learned path if the other path is locally originated, (3) discarding the path with longer AS_path, and (4) discarding the path with higher origin.

23. The system of claim 22 wherein any paths that have not been discarded by running the algorithm at each speaker form a set of partial best paths that are sent to the bRIB.

24. The system of claim 23 wherein the bRIB performs the second stage of route selection using the full best path selection algorithm to select the best path per prefix from among the partial best paths received from all speakers.

25. Apparatus adapted to distribute route selection in an implementation of a routing protocol executing on a router of a computer network, the apparatus comprising:
means for receiving announced paths from peers of the router at a first process of the routing protocol;
means for performing a first stage of route selection at the first process to select partial best paths;
means for forwarding the partial best paths to a second process of the routing protocol;
means for performing a second stage of route selection at the second process to select best paths; and
means for sending the selected best paths to the first process for announcement to the peers.

26. A computer readable medium containing executable program instructions for distributing route selection in an implementation of a routing protocol executing on a router of a computer network, the executable program instructions comprising program instructions for:
receiving announced paths from peers of the router at a plurality of first processes of the routing protocol;
performing a first stage of route selection at the first processes to select partial best paths;
forwarding the partial best paths to a second process of the routing protocol;
performing a second stage of route selection at the second process to select best paths;and
sending the selected best paths to the first processes for announcement to the peers.

* * * * *